Aug. 21, 1951     H. P. PHILLIPS     2,565,042

PISTON RING

Filed May 17, 1948

INVENTOR.
Harold P. Phillips
BY
ATTORNEY.

Patented Aug. 21, 1951

2,565,042

UNITED STATES PATENT OFFICE 2,565,042

PISTON RING

Harold P. Phillips, Hastings, Mich., assignor to Hastings Manufacturing Company, Hastings, Mich.

Application May 17, 1948, Serial No. 27,539

7 Claims. (Cl. 309—44)

This invention relates to improvements in piston rings.

The main objects of this invention are:

First, to provide a piston ring element so constructed and conformed as to facilitate high unit of pressure against a cylinder wall, close seating to the cylinder wall upon initial operation when first installed, effectual sealing for increased piston pressure, improved lubrication at its bearing points with a cylinder wall, and prolonged life.

Second to provide a piston ring element of the above type which may be readily and cheaply produced.

Further objects relating to details and economies of my invention will appear from the description to follow. The invention is defined in the claims.

A structure embodying the features of my invention is illustrated in the accompanying drawings wherein.

Figure 1:
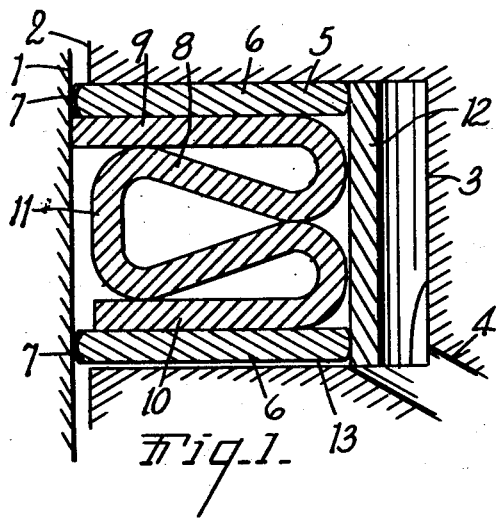
Fig. 1 is an enlarged fragmentary vertical section of a piston ring assembly embodying my invention installed in the ring groove of a piston and in operative relation to the cylinder.

In considering the accompanying drawings it should be borne in mind that for the sake of clearness in illustration that where relative clearances and relative tilting and movement of parts is shown such clearances and relative movements are shown relatively much greater than exists in the actual construction.

Referring to the drawing 1 designates a cylinder and 2 a piston having a ring groove 3 therein provided with oil drain passages 4. The ring assembly of my invention is designated generally by the reference numeral 5.

This assembly consists of a pair of upper and lower expansible cylinder wall engaging segments 6 of thin annular split ribbon-like metal, preferably of steel having a cylinder wall engaging surface of chrome plate 7. These segments have inherent resilience to expansibly engage the cylinder wall, and are disposed in axially spaced relation and in sliding engagement respectively with the top and bottom walls of the ring groove and are maintained in such spaced relation by a spacer element 8 formed of ribbon steel folded longitudinally upon itself to provide an upper side member 9, a lower side member 10 and intermediate plies in the form of a folded over tongue-like member 11 to spacingly support the upper and lower plies 9 and 10. The upper ply 9 engagingly supports the upper of the segments 6, and the lower ply 10 is engagingly supported by the lower of the segments 6. An expander spring 12 acts to force the segments 6 towards the cylinder wall 1. The spacer element 8 and expander 12 are of the type disclosed in my Patent No. 2,404,862. Suitable clearance for the segments 6 and spacer element 8 is provided in ring groove 3. This clearance shown at 13 in Figs. 1 and 2, relatively much greater than in the actual construction, may be a total of approximately .0045 of an inch for all the ring elements, or on the average of approximately .0015 of an inch for the spacer element 8 and each of the ring segments 6.

The surface 14 of the steel of the segments 6 on which the chrome plate 7 is deposited is curved, the radius of curvature of which is not greater than one and one half times the axial thickness of the steel and not greater than .045 of an inch regardless of the axial thickness of the steel, otherwise the segment would not seat for effective seal pressure and oil control. Preferably for the best results the radius of curvature is between one half and two thirds the axial thickness of the steel, but as above stated not greater than .045 of an inch. For instance with a thickness of .024 of an inch, a thickness commonly used, the radius of curvature is from .012 to .020 of an inch, and these rings work exceedingly well. Since the chrome plating 7 is between .0005 and .006 of an inch in thickness, preferably about .004 or .005 of an inch, and since this thickness is so very small as compared to the radius of curvature of the surface 14 of the steel, the radius of curvature of the cylinder wall engaging surface 15 of the chrome plating is for all practical purposes the same as that of the curved steel surface 14 on which it is deposited.

The radius of curvature of the chrome cylinder wall engaging surface 15 of the segments, not exceeding .045 provides a relatively very narrow hair line contact 16 of the chrome plated surface with the cylinder wall and provides relatively large pockets 17 for oil very close to the opposite sides of the narrow contact line. This narrow hairline contact and the relatively large oil pockets close to this narrow line contact thus provided facilitates a relatively high unit of pressure of the segments against the cylinder wall for close sealing of the segments to the cylinder wall during initial operation when the segments are first installed, effectual sealing between the segments and the cylinder wall for maximum piston pressure, and effectual oil control and lubrication close the narrow line of contact for long life of the segments. This construction has the advantages above described without the necessity of resorting to porosity produced by any method such as partially depleting a chrome plated surface or by using a rough surface so as to deposit the chrome in a rough manner, or by using any kind of etching to produce a rough surface on the chrome, as heretofore used. All of these roughened up surfaces are objectionable and while they temporarily help seating, in the long run they are not desirable for as they wear off, the chromium becomes flatter, the contact wider and the tendency to seal less. Also the method of partially depleting a chrome plated surface has a further objection in that there is debris or waste material rubbed off, produced by the depleting. This debris has an abrasive-like action and gets between the ring and the walls of the groove. My construction above described eliminates the necessity for any other means of producing quick seating. A feature of the chrome is that it will maintain this narrow contact, because of its extreme resistance to wear until the ring is thoroughly seated and in fact throughout the major life of the ring. The relatively small radius of the arc of curvature of the chrome surface 14 not only provides a relatively narrow line contact of the chrome with the cylinder wall to facilitate close seating of the segments, but also provides relatively large oil receiving pockets 17 very close to this narrow line of contact for thoroughly and effectually lubricating the same throughout the life of the segments.

Figure 2:
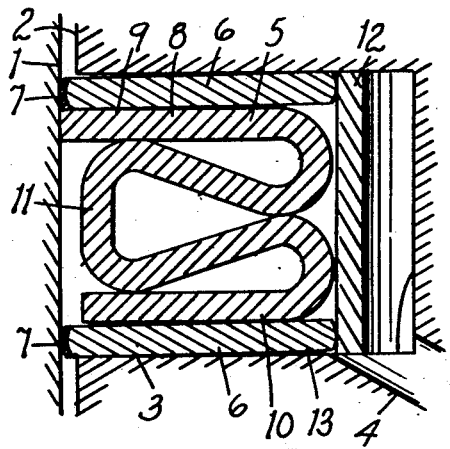
Fig. 2 is a view similar to Fig. 1 showing the upper and lower cylinder wall engaging elements of the ring assembly tilted slightly downwardly towards their outer edges at the start of the upward stroke of the piston in the cylinder.
Figure 4:
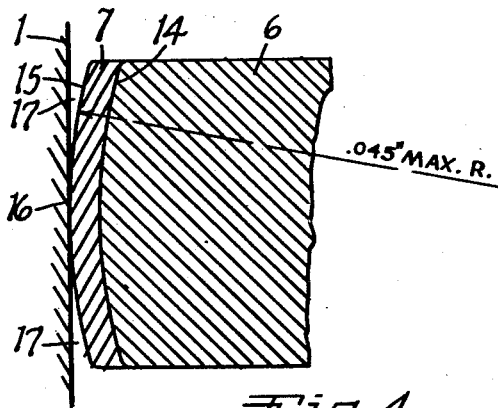
Fig. 4 is an enlarged section on the line 4—4 of Fig. 3 and illustrates the cylinder wall engaging element in a normal non-tilted position relative to the cylinder.
Figure 6:
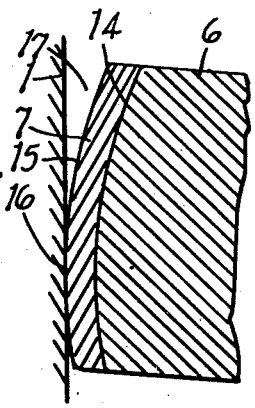
Fig. 6 is a view similar to that of Fig. 4 illustrating the cylinder wall engaging element tilted with its cylinder wall engaging surface upward at the start of the downward movement of the piston in the cylinder.
Figure 5:
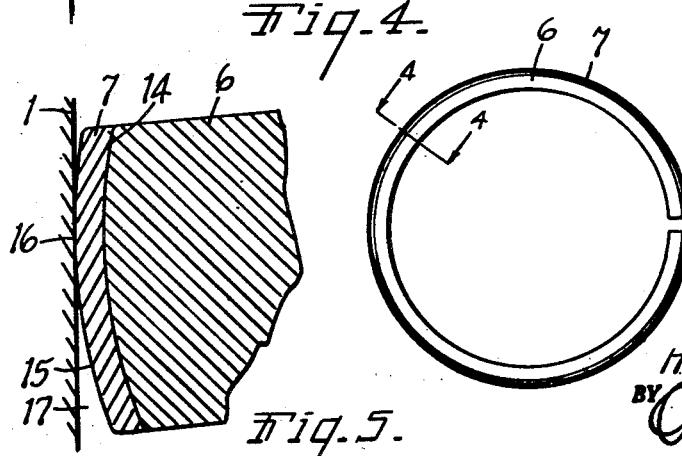
Fig. 5 is a view similar to that of Fig. 4 illustrating the cylinder wall engaging element tilted with its cylinder wall engaging surface downward at the start of the upward stroke of the piston in the cylinder.
Figure 3:
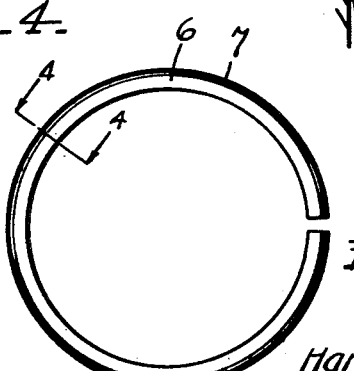
Fig. 3 is a plan view of one of the side cylinder wall engaging elements of the ring assembly.

Due to the clearance 13 of the segments 6 and spacer element 8 in the ring groove heretofore described there is a small amount of canting or tilting of the steel segments 6 at the reversing point of the piston. The radius of curvature of the chrome cylinder wall engaging surface 15 not exceeding that above described preserves the hairline contact of the surface 15 with the cylinder wall 1 during such canting or tilting and at all other times and positions of the segments in the ring groove as will be apparent by reference particularly to Figures 2, 4, 5 and 6, Fig. 4 showing the normal position of a ring segment 6, Figs. 2 and 5 showing the canting when the piston starts upwardly and Fig. 6 showing the tilting when the piston starts downwardly.

The curved cap of chromium 7 having the hairline contact 16 above described overcomes all seating problems, for it has been found that the hairline contact does not require normal seating and will control oil and seal pressure almost instantly when first installed. Because chromium is so very hard this line contact wears very slowly and stays narrow throughout the life of the ring element. The radius above described permits the oil to stay right up close to the frictional or contacting line of the ring against the cylinder wall. Another feature of the hairline contact of the chromium against the cylinder wall produced by the radius above described is its remarkable freedom from frictional drag. Rings so made having high tension against the cylinder wall produce no noticeable excess friction and the initial starting characteristics of such rings are remarkably free from drag so that the starter will spin the engine on the first start and no drag or resulting high temperatures from friction are found in the engine even during the first few miles of operation.

I have illustrated and described my improvement in an embodiment which is very practical. I have not attempted to illustrate other embodiments or adaptations as it is believed this disclosure will enable those skilled in the art to embody or adapt my improvements as may be desired.

Having thus described my invention what I claim as new and desire to secure by Letters Patent is:

1. A piston ring assembly comprising a pair of spaced relatively thin flat annular split cylinder wall engaging steel side elements and an annular split expansible spacer element intermediate said side elements, and an expander spring acting to force said side elements against a cylinder wall, said side elements having their cylinder wall engaging portions chrome plated, the chrome being plated on the steel, the cylinder wall engaging surface of the chrome plating being curved, the radius of the arc of curvature being not greater than one and one half times the axial thickness of a side member and not greater than .045 of an inch regardless of the axial thickness of the side member, to provide a relatively narrow hair line contact between said chrome cylinder wall engaging surface and a cylinder wall and a relatively high unit of pressure of the side members against the cylinder wall and to provide relatively large oil pockets close to and on opposite sides of said narrow line of contact, said narrow line of contact and high unit of pressure facilitating on the initial operation of newly installed side members relatively close seating of the side members in the cylinder for effective oil control and effective sealing for increased piston pressure, and said relatively large oil pockets close to and on opposite sides of said narrow line facilitating increased lubrication at said narrow line of contact.

2. A piston ring assembly comprising a pair of spaced flat annular split cylinder wall engaging side elements and an annular split expansible spacer element intermediate said side elements, and an expander spring acting to force said side elements against a cylinder wall, said side elements having their cylinder wall engaging portions chrome plated, the cylinder wall engaging surface of the chrome plating being curved, the radius of the arc of curvature being not greater than .045 of an inch regardless of the axial thickness of the side member, to provide a relatively narrow hair line contact between said chrome cylinder wall engaging surface and a cylinder wall and a relatively high unit of pressure of the side members against the cylinder wall and to provide relatively large oil pockets close to and on opposite sides of said narrow line of contact, said narrow line of contact and high unit of pressure facilitating on the initial operation of newly installed side members relatively close seating of the side members in the cylinder for effective oil control and effective sealing for increased piston pressure, and said relatively large oil pockets close to and on opposite sides of said narrow line facilitating increased lubrication at said narrow line of contact.

3. A piston ring assembly comprising a pair of spaced expansible flat annular split cylinder wall engaging side elements, and an annular split expansible spacer element disposed between said side elements, said side elements having their cylinder wall engaging portions chrome plated, the cylinder wall engaging surface of the chrome plating being curved, the radius of the arc of curvature being approximately between one-half and two thirds the axial thickness of a side member but not greater than .045 of an inch regardless of the axial thickness of the side member to provide a relatively narrow hair line contact between said chrome cylinder wall engaging surface and a cylinder wall and a relatively high unit of pressure of the side members against the cylinder wall and relatively large oil pockets close to and on opposite sides of said narrow line of contact.

4. A flat annular split expansible piston ring member having a curved chrome plated cylinder wall engaging surface, the radius of the arc of curvature of said surface being not greater than one and one half times the axial thickness of the member and not greater than .045 of an inch regardless of the axial thickness of the member.

5. A relatively thin annular split expansible steel piston ring member having a curved chrome plated cylinder wall engaging surface, the chrome surface being plated on the steel, the radius of the arc of curvature of said surface being not greater than .045 of an inch regardless of the axial thickness of the member.

6. A flat annular split expansible piston ring member having a curved chrome plated cylinder wall engaging surface, the radius of the arc of curvature of said surface being approximately between one-half and two-thirds the axial thickness of the ring member, but not greater than approximately .045 of an inch regardless of the axial thickness of the member.

7. An annular split expansible piston ring member having a chrome plated cylinder wall engaging surface, said chrome plated cylinder wall engaging surface being curved to provide a relatively narrow hair line contact with a cylinder wall, said hair-line contact facilitating relative high unit pressure of the ring member against the cylinder wall and facilitating on initial operation of a newly installed ring member close seating of the same against the cylinder wall for effective oil control and seal pressure without drag or resulting high temperatures from friction.

HAROLD P. PHILLIPS.

REFERENCES CITED

The following references are of record in the file of this patent:

UNITED STATES PATENTS

| Number | Name | Date |
|---|---|---|
| 1,356,258 | Burd | Oct. 19, 1920 |
| 1,544,180 | Reiter | June 30, 1925 |
| 1,956,014 | Fink | Apr. 24, 1934 |
| 2,236,721 | Teetor | Apr. 1, 1941 |
| 2,281,123 | Teetor | Apr. 28, 1942 |
| 2,281,873 | Engelhardt | May 5, 1942 |
| 2,313,395 | Phillips | Mar. 9, 1943 |
| 2,367,159 | Van der Horst | Jan. 9, 1945 |
| 2,380,654 | Lane | July 31, 1945 |
| 2,404,862 | Phillips | July 30, 1946 |

FOREIGN PATENTS

| Number | Country | Date |
|---|---|---|
| 840,101 | France | Apr. 19, 1939 |

OTHER REFERENCES

"Recent Developments in Piston Rings for High-speed Diesels," page 650.

Diesel Power and Transportation August, 1942.